United States Patent
Sin et al.

(10) Patent No.: US 6,661,625 B1
(45) Date of Patent: Dec. 9, 2003

(54) SPIN-DEPENDENT TUNNELING SENSOR WITH LOW RESISTANCE METAL OXIDE TUNNEL BARRIER

(76) Inventors: Kyusik Sin, 1080 Tanland Dr., Apt# 207, Palo Alto, CA (US) 94303; Ming Mao, 5136 Corona Ct., Pleasanton, CA (US) 94588; Hua-Ching Tong, 7184 Josslyn Dr., San Jose, CA (US) 95120; Chester Xiaowen Chien, 6191 McAbee Rd., San Jose, CA (US) 95120

( * ) Notice: Subject to any disclaimer, the term of this patent is extended or adjusted under 35 U.S.C. 154(b) by 37 days.

(21) Appl. No.: 09/789,207

(22) Filed: Feb. 20, 2001

(51) Int. Cl.$^7$ .................................................. G11B 5/39
(52) U.S. Cl. ................................................... 360/324.2
(58) Field of Search ....................................... 360/324.2

(56) References Cited

U.S. PATENT DOCUMENTS

| | | | |
|---|---|---|---|
| 5,390,061 A | 2/1995 | Nakatani et al. | 360/324.2 |
| 5,708,358 A | 1/1998 | Ravipati | 324/252 |
| 5,729,410 A | 3/1998 | Fontana, Jr. et al. | 360/324.2 |
| 5,739,990 A | 4/1998 | Ravipati et al. | 360/324.12 |
| 5,748,416 A | 5/1998 | Tobise et al. | 360/324.12 |
| 5,898,547 A | 4/1999 | Fontana, Jr. et al. | 360/324.2 |
| 5,901,018 A | 5/1999 | Fontana, Jr. et al. | 360/324.2 |
| 5,923,503 A | 7/1999 | Sato et al. | 360/327 |
| 5,966,012 A | 10/1999 | Parkin | 324/252 |
| 5,991,125 A | 11/1999 | Iwasaki et al. | 360/324.12 |
| 6,005,753 A | 12/1999 | Fontana, Jr. et al. | 360/324.2 |
| 6,077,618 A * | 6/2000 | Sakakima | 360/324.2 |
| 6,088,195 A | 7/2000 | Kamiguchi et al. | 360/324.12 |
| 6,094,428 A | 7/2000 | Bruckert et al. | 370/335 |
| 6,097,579 A | 8/2000 | Gill | 360/324.2 |
| 6,110,751 A * | 8/2000 | Sato | 360/324.2 |
| 6,462,980 B2 * | 10/2002 | Woldan | 365/158 |

* cited by examiner

Primary Examiner—A. J. Heinz (57) ABSTRACT

A thin film read/write head with a high performance read section that includes a spin-dependent tunneling sensor composed of a new low resistance metal oxide tunneling barrier material, such as chromium oxide ($Cr_xO_y$) or niobium oxide ($NbO_z$). The chromium oxide material ($Cr_xO_y$) can be, for example: $Cr_3O_4$, $Cr_2O_3$, $CrO_2$, $CrO_3$, $Cr_5O_{12}$, $Cr_6O_{15}$, other stoichiometry, or any combination thereof. The niobium oxide ($NbO_z$) can be, for example: NbO, $NbO_2$, $Nb_2O_5$, $Nb_2O_3$, $Nb_{12}O_{29}$, $Nb_{11}O_{27}$, other stoichiometry, or any combination thereof. The chromium oxide and the niobium oxide material provides a very low sensor resistance with an acceptable magnetoresistance ratio, which will enable the fabrication of high density read sensors, and thus read heads with high data transfer rate.

16 Claims, 9 Drawing Sheets

SPIN-DEPENDENT TUNNELING SENSOR WITH LOW RESISTANCE METAL OXIDE TUNNEL BARRIER

FIELD OF THE INVENTION

The present invention relates in general to data storage systems such as disk drives, and it particularly relates to a thin film read/write head for use in such data storage systems. More specifically, the present invention relates to a thin film, inductive tape read/write head with a spin-dependent tunneling sensor with a low resistance metal oxide tunnel barrier for increased density read sensors at high data transfer rate.

BACKGROUND OF THE INVENTION

In a conventional magnetic storage system, a thin film magnetic head includes an inductive read/write element mounted on a slider. The magnetic head is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. The lift force is opposed by equal and opposite spring forces applied by the suspension such that a predetermined flying, height is maintained over a full radial stroke of the rotary actuator assembly above the surface of the spinning magnetic disk.

A magnetic head typically includes a thin film read transducer formed in a read gap between two shields. The transducer can be a spin-dependent tunneling sensor (SDTS) which is comprised of two ferromagnetic layers separated by a thin insulating tunnel barrier and is based on the phenomenon of spin-polarized electron tunneling. One of the ferromagnetic layers has a higher saturation field in one direction of an applied magnetic field, typically due to its higher coercivity than the other ferromagnetic layer. The insulating tunnel barrier is thin enough that quantum mechanical tunneling occurs between the ferromagnetic layers. The tunneling phenomenon is electron-spin dependent, making the magnetic response of the spin-dependent tunneling sensor a function of the relative orientations and spin polarizations of the two ferromagnetic layers.

The state of the spin-dependent tunneling sensor is determined by measuring the resistance of the spin-dependent tunneling sensor when a sense current is passed perpendicularly through the spin-dependent tunneling sensor from one ferromagnetic layer to the other.

The probability of tunneling of charge carriers across the insulating tunnel barrier depends on the relative alignment of the magnetic moments (magnetization directions) of the two ferromagnetic layers. The tunneling current is spin polarized, which means that the electrical current passing from one of the ferromagnetic layers, for example, a layer whose magnetic moment is fixed or prevented from rotation, is predominantly composed of electrons of one spin type (spin up or spin down, depending on the orientation of the magnetic moment of the ferromagnetic layer).

The degree of spin polarization of the tunneling current is determined by the electronic band structure of the magnetic material comprising the ferromagnetic layer at the interface of the ferromagnetic layer with the tunnel barrier layer. The first ferromagnetic layer thus acts as a spin filter. The probability of tunneling of the charge carriers depends on the availability of electronic states of the same spin polarization as the spin polarization of the electrical current in the second ferromagnetic layer.

Usually, when the magnetic moment of the second ferromagnetic layer is parallel to the magnetic moment of the first ferromagnetic layer, there are more available electronic states than when the magnetic moment of the second ferromagnetic layer is aligned antiparallel to that of the first ferromagnetic layer. Thus, the tunneling probability of the charge carriers is highest when the magnetic moments of both layers are parallel, and is lowest when the magnetic moments are antiparallel. When the moments are arranged neither parallel nor antiparallel, the tunneling probability takes an intermediate value.

It has been recognized that the electrical resistance of the spin-dependent tunneling sensor depends on the spin polarization of the electrical current and the electronic states in both of the ferromagnetic layers. As a result, the two possible magnetization directions of the ferromagnetic layer whose magnetization direction is not fixed uniquely define two possible bit states (0 or 1) of the spin-dependent tunneling sensor.

A magnetoresistive (MR) sensor in a read head detects magnetic field signals through the resistance changes of a read element, fabricated of a magnetic material, as a function of the strength and direction of magnetic flux being sensed by the read element. The conventional MR sensor, such as that used as a MR read head for reading data in magnetic recording disk drives, operates on the basis of the anisotropic magnetoresistive (AMR) effect of the bulk magnetic material, which is typically permalloy (Ni81 Fe19). A component of the read element resistance varies as the square of the cosine of the angle between the magnetization direction in the read element and the direction of sense current through the read element. Recorded data can be read from a magnetic medium, such as the disk in a disk drive, because the external magnetic field from the recorded magnetic medium (the signal field) causes a change in the direction of magnetization in the read element, which in turn causes a change in resistance of the read element and a corresponding change in the sensed current or voltage.

The use of a spin-dependent tunneling sensor as a MR read head and in other applications is described in the following publications:

U.S. Pat. No. 6,097,579 to Gill;
U.S. Pat. No. 6,094,428 to Bruckert, et al.;
U.S. Pat. No. 6,088,195 to Kamiguchi, et al.;
U.S. Pat. No. 6,005,753 to Fontana, Jr., et al.;
U.S. Pat. No. 5,991,125 to Iwasaki, et al.;
U.S. Pat. No. 5,966,012 to Parkin;
U.S. Pat. No. 5,923,503 to Sato, et al.;
U.S. Pat. No. 5,901,018 to Fontana, Jr., et al.;
U.S. Pat. No. 5,898,547 to Fontana, Jr., et al.;
U.S. Pat. No. 5,748,416 to Tobise, et al.;
U.S. Pat. No. 5,739,990 to Ravipati, et al.;
U.S. Pat. No. 5,729,410 to Fontana, Jr., et al.;
U.S. Pat. No. 5,708,358 to Ravipati; and
U.S. Pat. No. 5,390,061 to Nakatani, et al.

One of the problems with such spin-dependent tunneling sensors is that as the areal density in magnetic recording exceeds 60 Gigabit/in$^2$, read sensors with relatively higher sensitivity are required. The spin dependent tunneling sensor is a very strong candidate for high-density magnetic recording read sensors because of its high magnetoresistance ratio. However, current spin-dependent tunneling sensors suffer from low data transfer rate because the combination of the high sensor resistance and the capacitance of the recording system.

Therefore, it would be desirable to provide a read head sensor that utilizes a low resistance spin-dependent tunneling sensor for increased data transfer rate.

SUMMARY OF THE INVENTION

One, aspect of the present invention is to satisfy this long felt and still unsatisfied need. According to the present invention, the read head includes a spin-dependent tunneling sensor composed of a new low resistance metal oxide tunneling barrier material, such as chromium oxide ($Cr_xO_y$) or niobium oxide ($NbO_z$).

The chromium oxide (($Cr_xO_y$) can be, for example: $Cr_3O_4$, $Cr_2O_3$, $CrO_2$, $CrO_3$, $Cr_5O_{12}$, $Cr_6O_{15}$, other stoichiometry, or any combination thereof. The niobium oxide ($NbO_z$) can be, for example: NbO, $NbO_2$, $Nb_2O_5$, $Nb_2O_3$, $Nb_{12}O_{29}$, $Nb_{11}O_{27}$, other stoichiometry, or any combination thereof.

The chromium oxides and the niobium oxides provide a very low sensor resistance with an acceptable magnetoresistance ratio. The use of spin-dependent tunneling sensors with the appropriate composition for the metal oxide barrier will enable the fabrication of high density read sensors, and thus read heads with high data transfer rate.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF THE INVENTION

Figure 1:
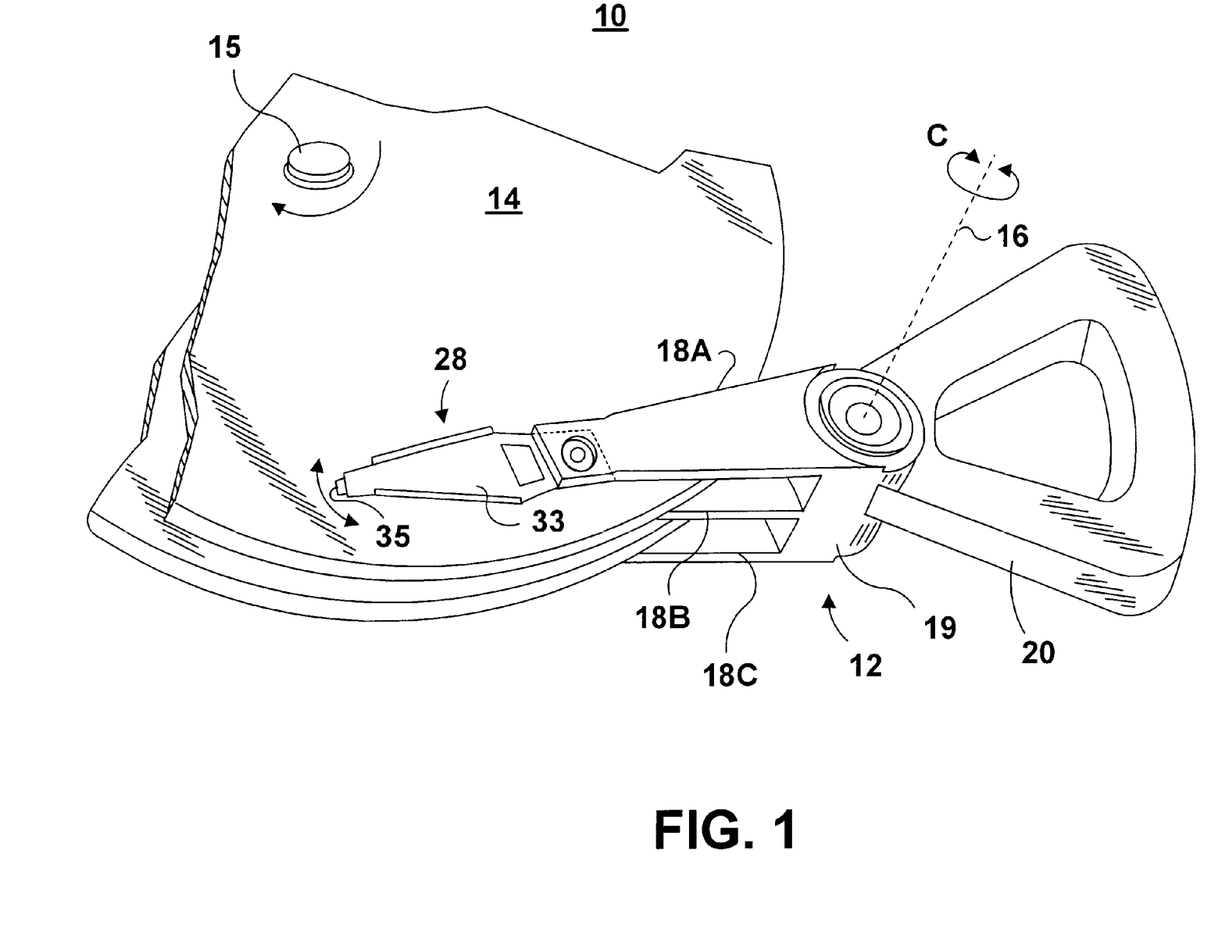
FIG. 1 is a fragmentary perspective view of a data storage system utilizing a read/write head that incorporates a spin-dependent tunneling sensor according to the present invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
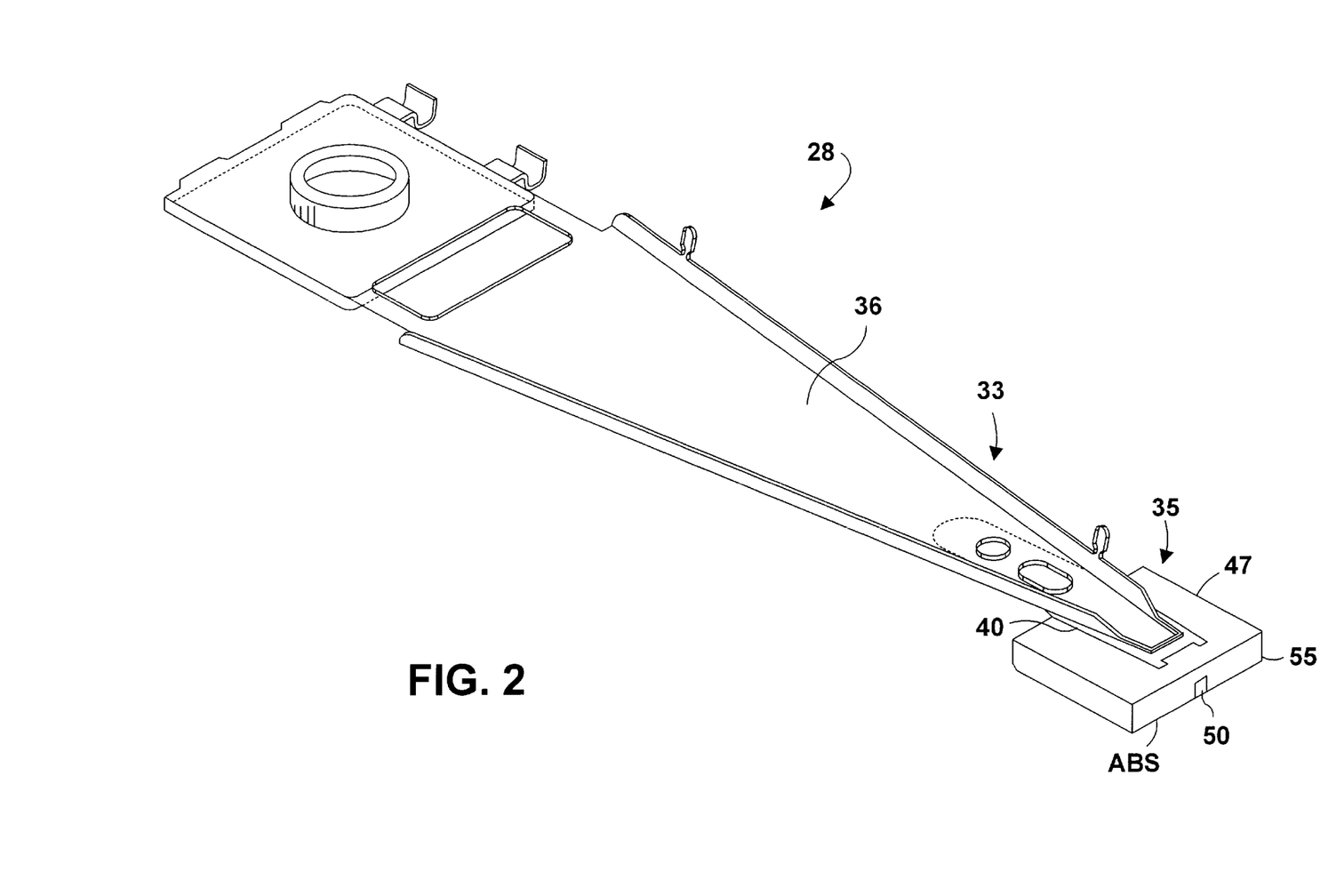
FIG. 2 is a perspective view of a head gimbal assembly comprised of a suspension, and a slider to which the read/write head of FIG. 1 is secured, for use in a head stack assembly.

A head gimbal assembly (HGA) 28 is secured to each of the actuator arms, for instance 18A. With reference to FIG. 2, the HGA 28 is comprised of a suspension 33 and a read/write head 35. The suspension 33 includes a resilient load beam 36 and a flexure 40 to which the head 35 is secured.

The head 35 is formed of a slider 47 secured to the free end of the load beam 36 by means of the flexure 40, and a read/write element 50 supported by the slider 47. In the example illustrated in FIG. 2, the read/write element 50 is secured to the trailing edge 55 of the slider 47. The slider 47 can be any conventional or available slider.

Figure 3:
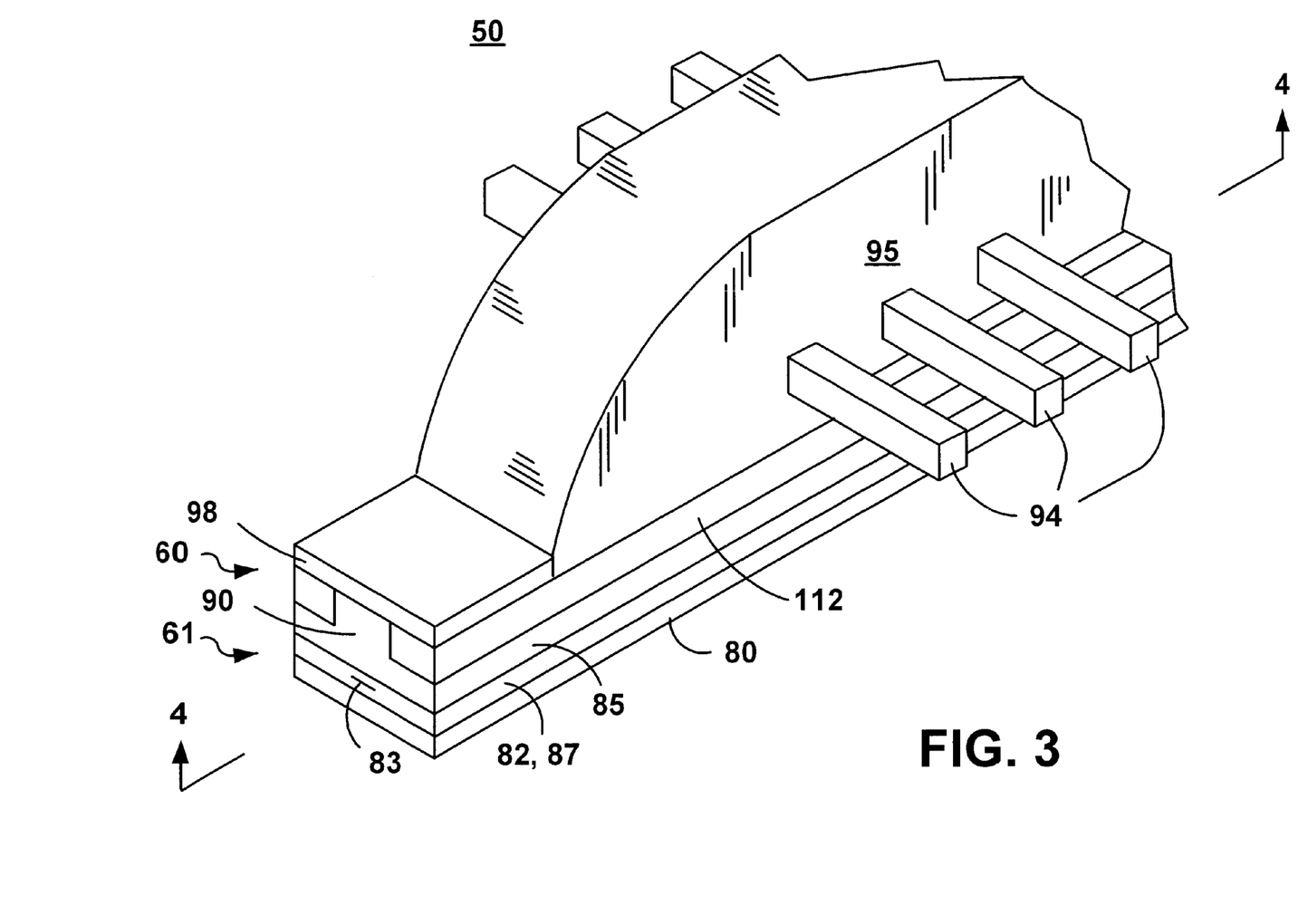
FIG. 3 is an enlarged perspective view of a thin film read/write element (with the top yoke removed for clarity of illustration) forming part of the read/write head of FIGS. 1 and 2, and made according to the present invention.
Figure 4:
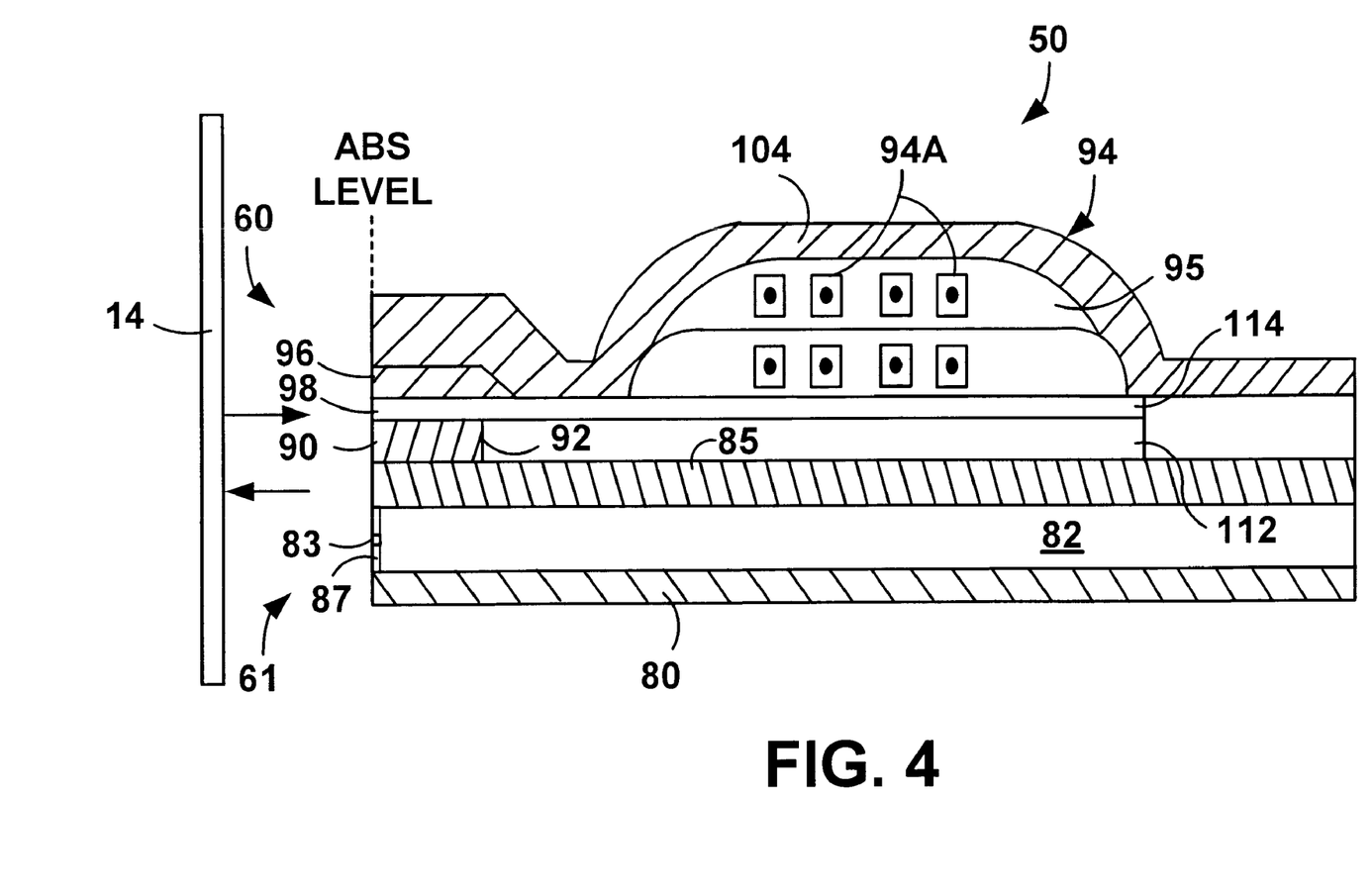
FIG. 4 is a cross-sectional view of the read/write element of FIG. 3 taken along line 4—4, and shown positioned relative to a data storage medium.
Figure 5:
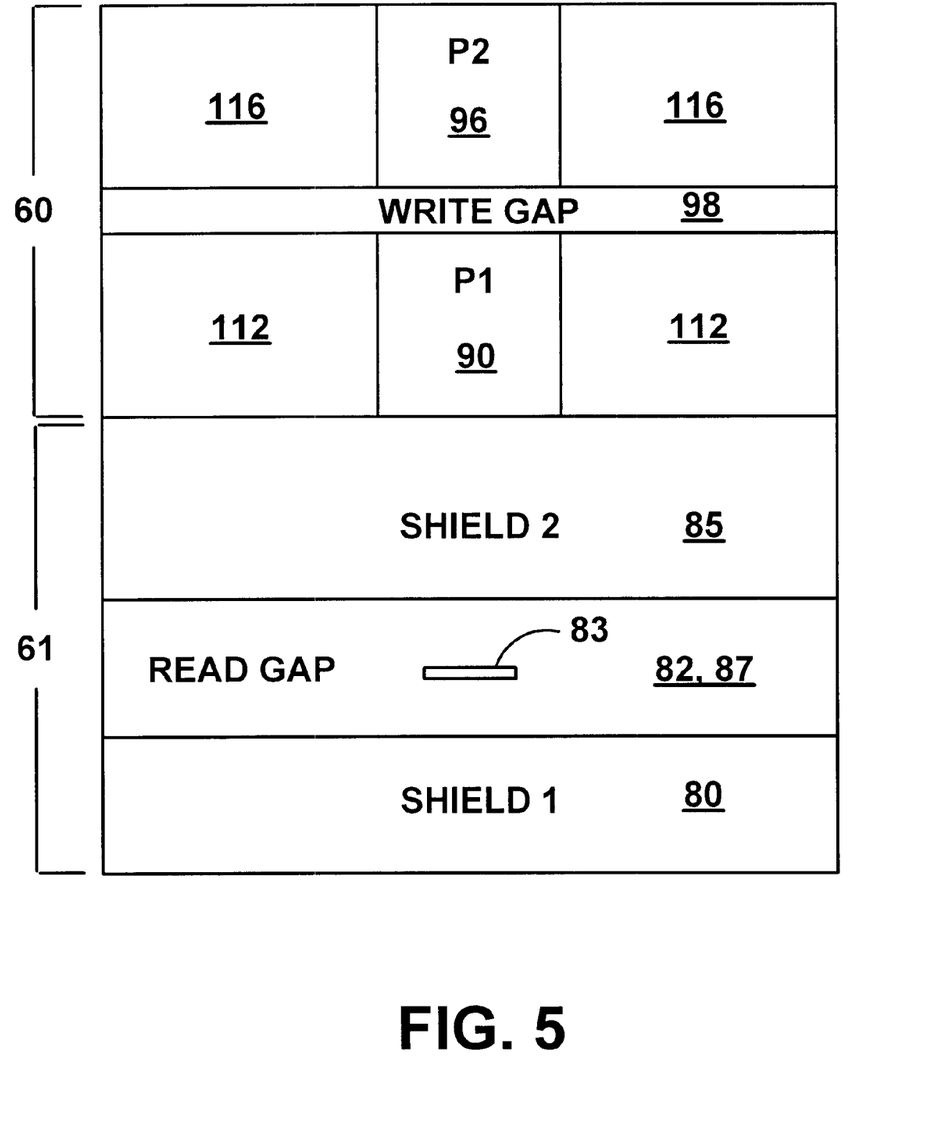
FIG. 5 is an ABS view of the read/write head of the previous drawings.

The details of the read/write element 50 will now be described with reference to FIGS. 3, 4, and 5. The read/write element 50 integrates a write section 60 and a read section 61. The read section 61 is formed of a first shield layer (Shield 1) 80 preferably made of a material that is both magnetically and electrically conductive. For example, the first shield layer 80 can have a nickel-iron (NiFe) composition, such as Permalloy, or a ferromagnetic composition with high permeability. The thickness of the first shield layer 80 can be in the range of approximately 0.5 micron to approximately 14 microns.

An insulating layer 82 is formed over substantially the entire surface of the first shield layer 80. The insulation layer can be made of any suitable material, for example alumina ($Al_2O_3$), aluminum oxide or silicon nitride. The read gap 87 can be made of any suitable non-magnetic, conductive materials, for example, copper, gold, tantalum, and chromium. The conductive read gap 87 is part of the lead to the sensor.

The read section 61 is also comprised, of a read sensor 83 formed within the insulation layer 82. As it will be described later in greater detail in connection with FIGS. 6 and 7, the read sensor 83 can be any suitable sensor, including but not limited to a magnetoresistive (MR) element, a giant magnetoresistive (GMR) element, a spin valve, or a Current In the Plane mode (CIP) sensor with a low resistance metal oxide tunnel barrier for increased density read sensors at high data transfer rate.

The read section 61 is also comprised of a second shield layer (Shield 2) 85 that is made of an electrically and magnetically conductive material, which may be similar or equivalent to that of the first shield layer 80. The second shield layer 85 is formed over substantially the entire surface of the insulating layer 82, and has a thickness that can be substantially similar or equivalent to that of the first shield layer 80.

A read circuit 102 (not shown) is connected to the first shield layer 80 and the second shield layer 85, such that during a read mode the read circuit sends a sensing electric current $I_R$ through the sensor 83 and the second shield layer 85. The read-sense current $I_R$ flows perpendicularly through the sensor 83, thus avoiding the along-the plane electromigration problems and magnetic-biasing due to parallel-current problems associated with earlier designs based on CIP operation. (Current In the Plane mode). Reference is made to U.S. Pat. Nos. 5,576,914 and 5,446,613 that are incorporated herein by reference, and which describe the operation of a magnetic read/write head.

The write section 60 is comprised of a first pole layer or pedestal P1 (also referenced by the numeral 90) that extends, for example, integrally from the second shield layer 85. A write coil 94 include a plurality of multi-layered conductive coil elements (or conductors) 94A, only a few of which are illustrated also form part of the write section 60. The coil elements 94A are formed within an insulating layer 95. The write coil 94 can have two, four or more turns as required, to generate the desired write field.

A second pole layer 96 is made of a magnetically conductive material, and be for example only, similar or equivalent to that of the first shield layer 80 and the first pole layer 85. The second pole layer 96 is formed over, and is separated from the pedestal 90, to define a write gap 98 therewith. The thickness of the second pole layer 96 can be substantially the same as, or similar to that of the first shield layer 80. The write gap 98 can be filled with a material similar or equivalent to that of the insulating layer 82. With reference to FIG. 4, the second pole layer 96 includes a top (or upper) yoke 104.

A write circuit 100 (not shown) is connected to the write coil 94, and, during a write mode, it sends an electrical current $I_W$ to induce a flux flow through the write gap 98. Changes in the flux flow across the write gap 98 produce the different magnetic orientations of vertical magnetized regions or domains in the disk 14 during a write operation.

With reference to FIG. 2, the read/write element 50 is mounted at the trailing edge 55 of the slider 47 so that its forwardmost tip is generally flush with the ABS of the slider 47. In another embodiment according to the present invention more than one read/write element 50 can be secured to the trailing edge 55 or other side(s) of the slider 47.

Figure 6:
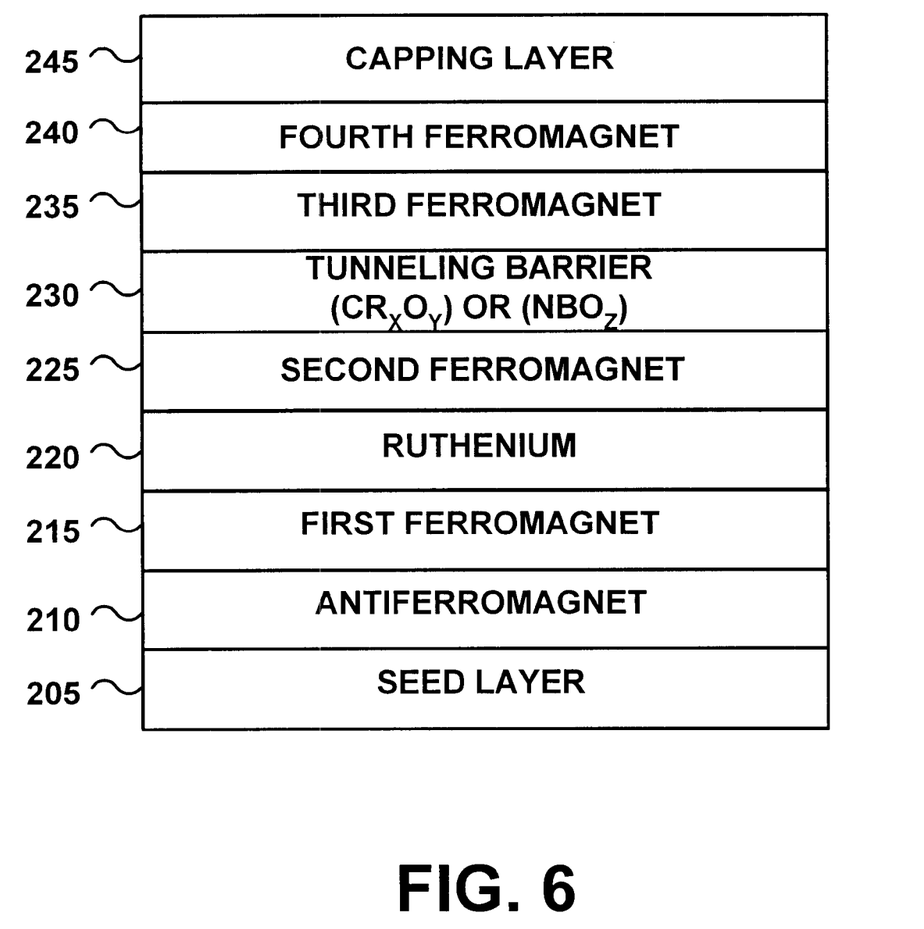
FIG. 6 is an enlarged, ABS view of a first embodiment of the spin-dependent tunneling sensor for use in the read/write head of the present invention.

Having described the general environment in which the read sensor 83 operates, an exemplary spin-dependent tunneling sensor 200 according to a first embodiment of the present invention will now be described with reference to FIG. 6. The spin-dependent tunneling sensor 200 according to this specific, non-exclusive example is comprised of a plurality of superimposed layers, as set forth in Table I below. Though dimensions will be provided herein as examples, for clarity of illustration, it should be clear to those of ordinary skills in the art that other dimensions may be used without departing from the scope of the present invention.

TABLE 1

SPIN DEPENDENT TUNNELING SENSOR

| Layer | Material | Thickness (in Å) |
|---|---|---|
| Capping layer 245 | NiFeCr or Ta | 50~100 |
| Fourth ferromagnet layer 240 | NiFe | 10~50 |
| Third ferromagnet layer 235 | CoFe | 5~20 |
| Tunneling barrier 230 | CrOx | 4~5 |
| Second ferromagnet layer 225 | CoFe | 10~20 |
| Ru layer 220 | Ru | 6~8 |

TABLE 1-continued

SPIN DEPENDENT TUNNELING SENSOR

| Layer | Material | Thickness (in Å) |
|---|---|---|
| First ferromagnet layer 215 | CoFe | 10~20 |
| Antiferromagnet layer 210 | PtMn | 150~350 |
| Seed layer 205 | NiFeCr | 50 |

The first layer in the manufacturing of the spin-dependent tunneling sensor 200 is a seed layer 205 made, for example, of nickel iron chromium (NiFeCr) with a thickness on the order of 50 Angstroms.

Next, an antiferromagnetic layer 210 is formed on the seed layer 205. The antiferromagnetic layer 210 is composed, for example, of platinum manganese (PtMn) with a thickness in the range of approximately 150 to 350 Angstroms.

A first ferromagnetic layer 215 is then formed on the antiferromagnetic layer 210, and is composed, for example, of cobalt iron (CoFe) with a thickness in the range of approximately 10 to 20 Angstroms.

A ruthenium (Ru) layer 220 is formed on the first ferromagnetic layer 215, and has a thickness in the range of approximately 6 to 8 Angstroms.

A second ferromagnetic layer 225 is then formed on the ruthenium layer 220, and is composed, for example, of cobalt iron (CoFe) with a thickness in the range of approximately 10 to 20 Angstroms.

The bottom pinned structure 200 described above includes a pinned layer comprised of the first ferromagnet layer 215, the ruthenium layer 220, and the second ferromagnet layer 225; and a free layer comprised of the third ferromagnet layer 235 and the fourth ferromagnet layer 240. For a top pinned structure (not shown), the pinned layer and the antiferromagnet layer will be formed over the free layer (which in this embodiment will be at the bottom).

A thin tunneling barrier 230 is formed on the second ferromagnet layer 225. According to the exemplary embodiment illustrated herein, the tunneling barrier 230 is composed of chromium oxide ($Cr_xO_y$) with a thickness in the range of approximately 4 to 5 Angstroms. To this end, a metallic chromium (Cr) layer is deposited on either the pinned layer (e.g. second ferromagnet layer 225) or the free layer (e.g. third ferromagnet layer 235) depending on the structure. The chromium layer can be deposited with DC magnetron sputtering, RF sputtering, ion beam sputtering, or any other suitable deposition technique.

The chromium layer is then oxidized to form the tunneling barrier 230. A preferred oxidation method is natural oxidation. It should however be understood that plasma oxidation, ion beam oxidation, ozone oxidation, radical oxidation, or any other suitable oxidation technique can also be used to form chromium oxide. A preferred process condition for natural oxidation is approximately 10 to 50 Torr for approximately 1 min to 2 hours. The chromium oxide ($Cr_xO_y$) can be, for example: $Cr_3O_4$, $Cr_2O_3$, $CrO_2$, $CrO_3$, $Cr_5O_{12}$, $Cr_6O_{15}$, other stoichiometry or any combination thereof.

Alternatively, the tunneling barrier 230 can be composed of niobium oxide ($NbO_z$) such as, for example: $NbO$, $NbO_2$, $Nb_2O_5$, $Nb_2O_3$, $Nb_{12}O_{29}$, $Nb_{11}O_{27}$, other stoichiometry, or any combination thereof. The chromium oxides and the niobium oxides provide a very low sensor resistance with an acceptable magnetoresistance ratio. The use of spin-dependent tunneling sensors 200 of the present invention will enable the fabrication of high density read sensors, and thus read heads with high data transfer rate. In addition, by using the metal oxide of choice, i.e., chromium oxide or niobium oxide, it is possible to form a very thin tunneling barrier 230 without pinholes.

Following the completion of the tunneling barrier 230, the fabrication of the spin-dependent tunneling sensor 200 is completed by depositing the remaining layers on the tunneling barrier 230. As an illustration, a third ferromagnetic layer 235 is formed on the tunneling barrier 230, and is composed, for example, of cobalt iron (CoFe) with a thickness in the range of approximately 5 to 20 Angstroms.

A fourth ferromagnetic layer 240 is formed on the third ferromagnetic layer 235, and is composed, for example, of nickel iron (NiFe) with a thickness in the range of approximately 10 to 50 Angstroms.

A capping layer 245 is then formed on the fourth ferromagnetic layer 240, and is composed, for example of nickel iron chromium (NiFeCr), or tantalum (Ta), with a thickness ranging between approximately 50 to 100 Angstroms.

Figure 7:
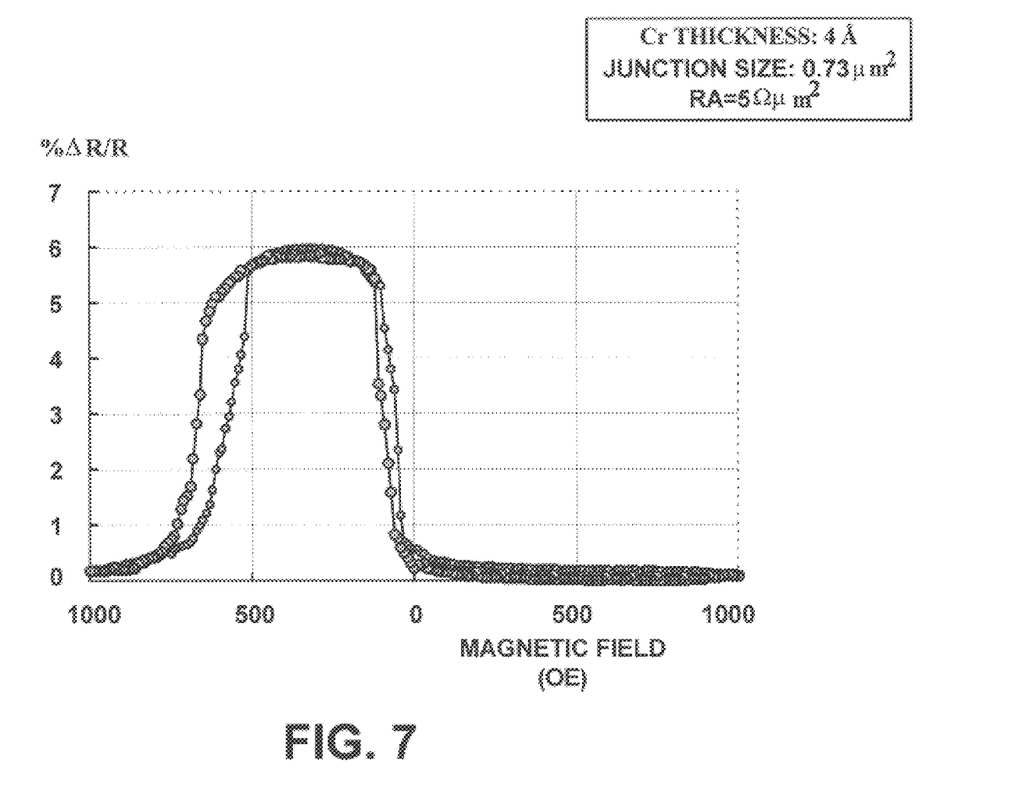
FIG. 7 is a graph that represents an exemplary magnetoresistive (MR) hysteresis curve of spin-dependent tunneling sensor junction with a chromium oxide tunneling barrier.

FIG. 7 is a graph that represents an exemplary magneto-resistive (MR) hysteresis curve of spin-dependent tunneling sensor junction with a chromium oxide tunneling barrier. The tunneling barrier 230 (FIG. 6) is fabricated by natural oxidation of a 4 Angstrom chromium layer at 30 Torr $O_2$ for 5 minutes. The magneto-resistive (MR) ratio is approximately 6% with a resistance-area (RA) of 5 $\Omega \mu m^2$.

Figure 8:
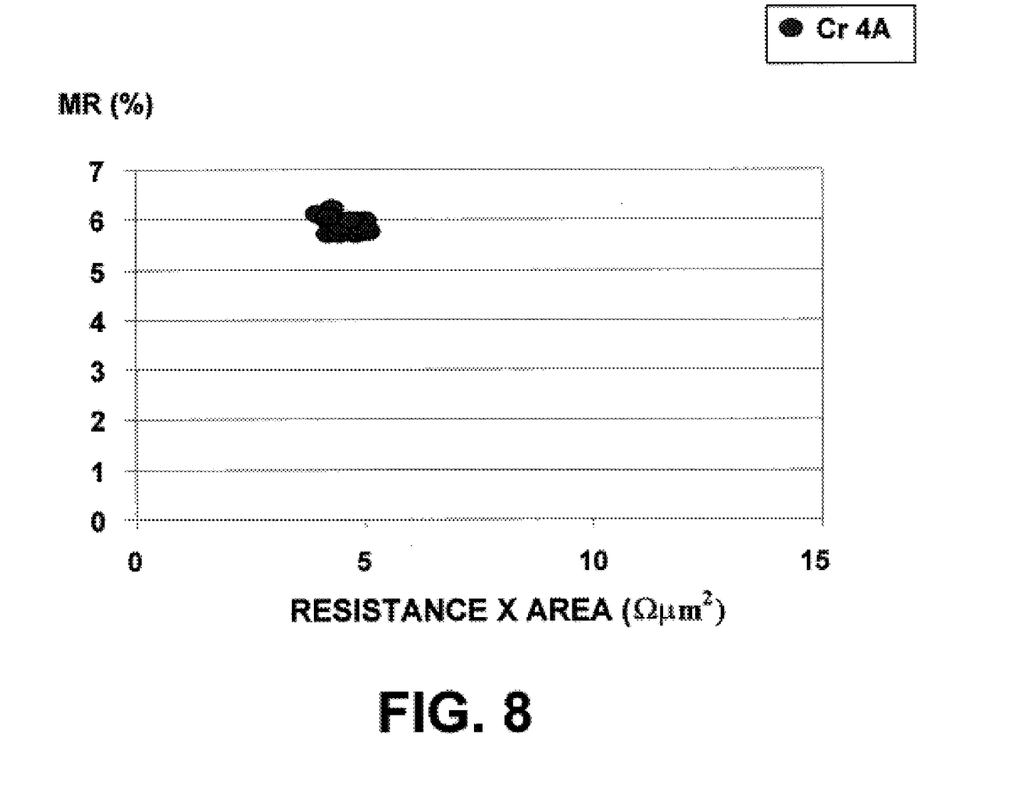
FIG. 8 is a graph that illustrates variations of the MR ratio relative to the resistance-area of its chromium oxide barrier junctions.

FIG. 8 is a graph that illustrates variations of MR ratio relative to the resistance-area of its chromium oxide barrier junction 200. This graph illustrates the MR ratio of the spin-dependent tunneling sensor 200 is quite high, i.e., on the order of 6% for a resistance-area (RA) of 5 $\Omega \mu m^2$.

The graphs of FIGS. 7 and 8 illustrate clear parallel and antiparallel configurations of magnetization between the pinned layer (e.g. second ferromagnet layer 225) and the free layer (e.g. third ferromagnet layer 235) for a simple bottom pinned junction. For a simple bottom pinned structure 200, it is possible to omit any one of the following pairs of layers: (215, 220) or (220, 225). The chromium oxide material of the tunneling barrier 230 serves as a spacer to decouple the two contiguous ferromagnetic layers 225, 235, in addition to its function as a tunneling barrier.

As described, the tunneling barrier 230 is quite thin and has a low junction resistance. These characteristics enable the user of the spin-dependent tunneling sensor 200 in high density and high data rate read heads. Furthermore, the chromium oxide tunneling barrier 230 can be used with any combination of the following pinned layers:

A. Simple bottom pinned structure;

B. Simple top pinned structure;

C. Bottom synthetic pinned structure (200); or

D. Top synthetic pinned structure.

Figure 9:
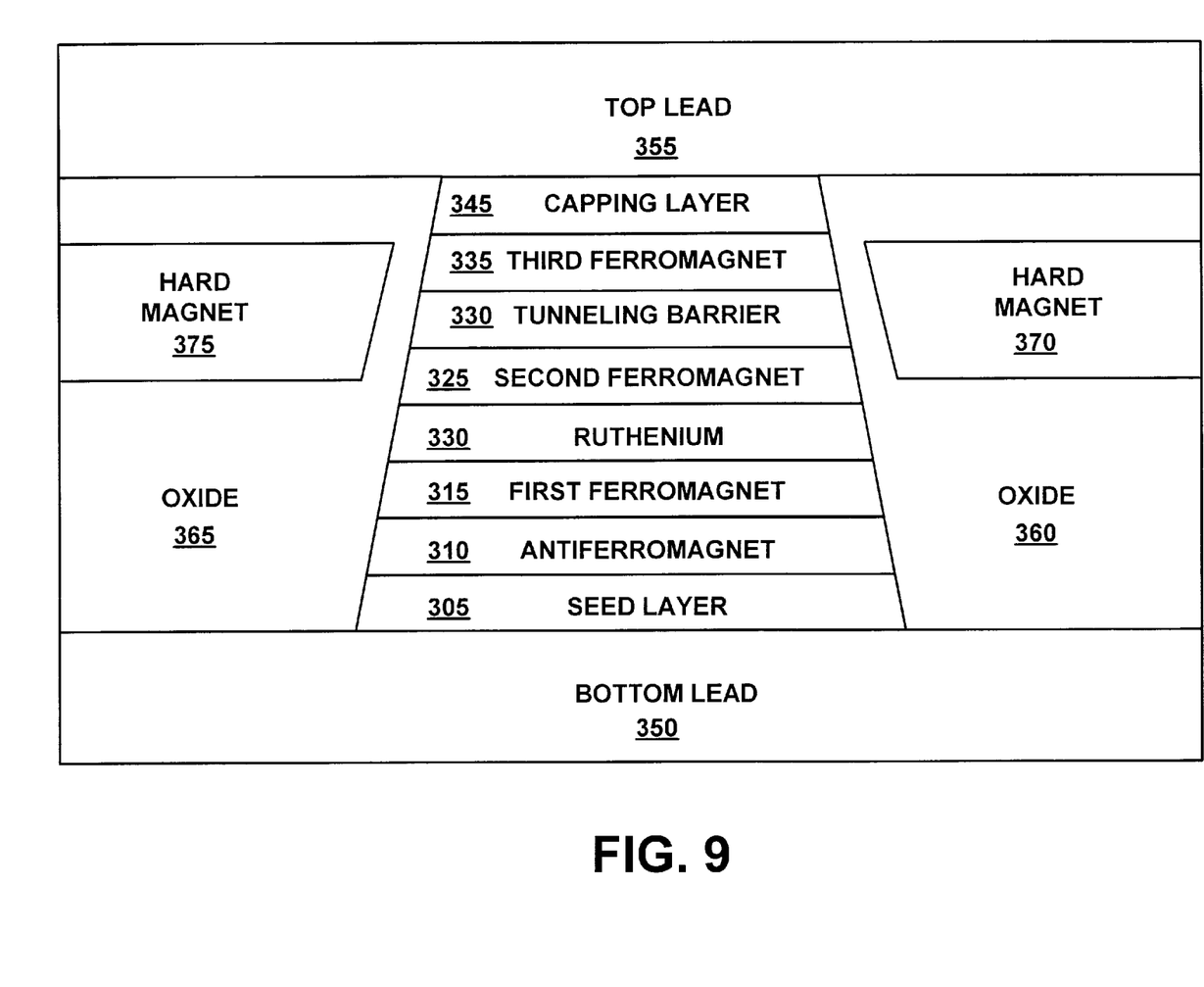
FIG. 9 is an enlarged, ABS view of a second embodiment of the spin-dependent tunneling sensor for use in the read/write head of the present invention.

FIG. 9 is an enlarged, ABS view of another spin-dependent tunneling sensor 300 for use in the read/write head 35 of the present invention. The spin-dependent tunneling sensor 300 is generally similar in function, design, and construction to the spin-dependent tunneling sensor 200 of FIG. 6, in that the spin-dependent tunneling sensor 300 is comprised of a similar layered central arrangement.

The central arrangement of the spin-dependent tunneling sensor 300 is comprised of a seed layer 305 that corresponds to the seed layer 205 of the spin-dependent tunneling sensor 200. An antiferromagnetic layer 310 corresponds to the antiferromagnetic layer 210. A first ferromagnetic layer 315 corresponds to the first ferromagnetic layer 315. A ruthenium layer 320 corresponds to the ruthenium layer 220. A second ferromagnetic layer 325 corresponds to the second ferromagnetic layer 225. A tunneling barrier 350 corresponds to the tunneling barrier 250. A third ferromagnetic layer 335 corresponds to the combination of the third and fourth ferromagnetic layers 235, 240, respectively of the spin-dependent tunneling sensor 200.

Distinctive features of the spin-dependent tunneling sensor 300 include the trapezoidal shaping of the central arrangement, and the bounding of this central arrangement with the following layers: a bottom lead 350, a top lead 355, two insulating layers 360, 365 that are comprised for example of $Al_2O_3$, $SiO_2$, $Si_3N_4$, etc., and two hard magnets 370, 375.

Though the general configurations of the spin-dependent tunneling sensors 200 and 300, using aluminum oxide as the tunneling barrier is known in the field, the use of the metal oxide described herein, in combination with these configurations is novel and offers significant features and advantages, not achieved heretofore by known designs.

It should be understood that the geometry, compositions, and dimensions of the elements described herein can be modified within the scope of the invention and are not intended to be the exclusive. As an example, the tunneling barriers 230 (FIG. 6) or 330 (FIG. 9), can be comprised of a combination of chromium oxide ($Cr_xO_y$) and niobium oxide ($NbO_z$), or a layered structure of chromium oxide ($Cr_xO_y$) and niobium oxide ($NbO_z$).

What is claimed is:

1. A thin film head with a read section, for use in a data storage device, comprising:

a first shield;

a second shield;

a read gap formed between the first and second shields; and a spin-dependent tunneling sensor formed within the read gap and including a plurality of superimposed thin film layers, wherein the thin film layers include two ferromagnetic layers, and a tunnel barrier sandwiched between the two ferromagnetic layers and composed of a low resistance metal oxide; and wherein the low resistance metal oxide is formed of chromium oxide CrxOy.

2. The thin film head of claim 1, wherein the chromium oxide CrxOy is selected from a group consisting essentially of: $Cr_3O_4$, $Cr_2O_3$, $CrO_2$, $CrO_3$, $Cr_5O_{12}$, $Cr_6O_{15}$.

3. The thin film head of claim 1, wherein the low resistance metal oxide also is formed of niobium oxide ($NbO_z$).

4. The thin film head of claim 3, wherein the niobium oxide $NbO_z$ is selected from a group consisting essentially of: $NbO$, $NbO_2$, $Nb_2O_5$, $Nb_2O_3$, $Nb_{12}O_{29}$, $Nb_{11}O_{27}$.

5. A head gimbal assembly comprising:

a suspension; and a thin film head secured to said suspension, and defining a read section;

the read section including:

a first shield;

a second shield;

a read gap formed between the first and second shields; and a spin-dependent tunneling sensor formed within the read gap and including a plurality of superimposed thin film layers, wherein the thin film layers include two ferromagnetic layers, and a tunnel barrier sandwiched between the two ferromagnetic layers and composed of a low resistance metal oxide; and wherein the low resistance metal oxide is formed of chromium oxide CrxOy.

6. The head gimbal assembly of claim 5, wherein the chromium oxide CrxOy is selected from a group consisting essentially of: $Cr_3O_4$, $Cr_2O_3$, $CrO_2$, $CrO_3$, $Cr_5O_{12}$, $Cr_6O_{15}$.

7. The head gimbal assembly of claim 5, wherein the low resistance metal oxide also is formed of niobium oxide ($NbO_z$).

8. The head gimbal assembly of claim 7, wherein the niobium oxide $NbO_z$ is selected from a group consisting essentially of: NbO, $NbO_2$, $Nb_2O_5$, $Nb_2O_3$, $Nb_{12}O_{29}$, $Nb_{11}O_{27}$.

9. A method of making a thin film head that includes a read section, comprising:

forming a first shield;

forming a second shield;

forming a read gap between the first and second shields; and forming a spin-dependent tunneling sensor with a plurality of superimposed thin film layers, within the read gap, and wherein forming the sensor with the thin film layers includes forming two ferromagnetic layers and a tunnel barrier that is sandwiched between the two ferromagnetic layers and composed of a low resistance metal oxide; and wherein forming the tunnel barrier includes using chromium oxide CrxOy.

10. The method of claim 9, wherein forming the tunnel barrier includes using chromium oxide CrxOy selected from a group consisting essentially of: $Cr_3O_4$, $Cr_2O_3$, $CrO_2$, $CrO_3$, $Cr_5O_{12}$, $Cr_6O_{15}$.

11. The method of claim 9, wherein forming the tunnel barrier includes using niobium oxide ($NbO_z$).

12. The method of claim 11, wherein forming the tunnel barrier includes using niobium oxide ($NbO_z$) selected from a group consisting essentially of: NbO, $NbO_2$, $Nb_2O_5$, $Nb_2O_3$, $Nb_{12}O_{29}$, $Nb_{11}O_{27}$.

13. A data storage device including a head gimbal assembly, comprising:

the head gimbal assembly includes a thin film head with a read section comprised of:

a first shield;

a second shield;

a read gap formed between the first and second shields; and a spin-dependent tunneling sensor formed within the read gap and including a plurality of superimposed thin film layers, wherein the thin film layers include two ferromagnetic layers, and a tunnel barrier sandwiched between the two ferromagnetic layers and composed of a low resistance metal oxide; and wherein the low resistance metal oxide is formed of chromium oxide CrxOy.

14. The data storage device of claim 13, wherein the chromium oxide CrxOy is selected from a group consisting essentially of: $Cr_3O_4$, $Cr_2O_3$, $CrO_2$, $CrO_3$, $Cr_5O_{12}$, $Cr_6O_{15}$.

15. The data storage device of claim 13, wherein the low resistance metal oxide also is formed of niobium oxide ($NbO_z$).

16. The data storage device of claim 15, wherein the niobium oxide $NbO_z$ is selected from a group consisting essentially of: NbO, $NbO_2$, $Nb_2O_5$, $Nb_2O_3$, $Nb_{12}O_{29}$, $Nb_{11}O_{27}$.

* * * * *